United States Patent
Aoyagi et al.

(10) Patent No.: US 12,262,310 B2
(45) Date of Patent: *Mar. 25, 2025

(54) CONNECTION AND NOTIFICATION FOR PRIORITY COMMUNICATION

(71) Applicant: RAKUTEN MOBILE, INC., Tokyo (JP)

(72) Inventors: Kenichiro Aoyagi, Tokyo (JP); Awn Muhammad, Tokyo (JP); Tsunehiko Chiba, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/757,562

(22) PCT Filed: Jun. 22, 2021

(86) PCT No.: PCT/JP2021/023558
§ 371 (c)(1),
(2) Date: Jun. 17, 2022

(87) PCT Pub. No.: WO2022/208915
PCT Pub. Date: Oct. 6, 2022

(65) Prior Publication Data
US 2024/0163780 A1    May 16, 2024

(30) Foreign Application Priority Data
Mar. 31, 2021    (JP) .................................. 2021-059614

(51) Int. Cl.
*H04W 48/18* (2009.01)
*H04W 76/10* (2018.01)
(Continued)

(52) U.S. Cl.
CPC .......... *H04W 48/18* (2013.01); *H04W 76/10* (2018.02); *H04W 76/30* (2018.02); *H04W 76/50* (2018.02)

(58) Field of Classification Search
CPC ................................ H04W 76/50; H04W 4/90
See application file for complete search history.

(56) References Cited

U.S. PATENT DOCUMENTS 8,036,663 B2 * 10/2011 Jin ........................ H04W 36/26
455/437
10,542,471 B1 * 1/2020 Oroskar .......... H04W 36/00224
(Continued)

FOREIGN PATENT DOCUMENTS

EP        3634041 A1    4/2020
WO    2018194125 A1    10/2018

OTHER PUBLICATIONS

Office Action in JP Application No. 2023-510177, mailed Aug. 6, 2024, 6pp.

*Primary Examiner* — Zhiren Qin
(74) *Attorney, Agent, or Firm* — HAUPTMAN HAM, LLP

(57) ABSTRACT

A wireless communication system includes: a priority communication detection unit that detects priority communication from a communicator communicating wirelessly; a connection unit for connecting the communicator for which the priority communication is detected to a second wireless communication network that is different from a first wireless communication network to which the communicator is connected; a notification unit that notifies the first wireless communication network that the connection of the communicator to the second wireless communication network is due to the detected priority communication; and a disconnection unit that disconnects the communicator from the first (Continued)

wireless communication network after the notification unit notifies the first wireless communication network.

11 Claims, 4 Drawing Sheets

(51) Int. Cl.
*H04W 76/30* (2018.01)
*H04W 76/50* (2018.01)

(56) References Cited

U.S. PATENT DOCUMENTS

| | | |
|---|---|---|
| 10,791,450 B1* | 9/2020 | Bakker ............... H04W 60/005 |
| 2010/0297979 A1 | 11/2010 | Watfa et al. |
| 2011/0103277 A1 | 5/2011 | Watfa et al. |
| 2016/0105832 A1* | 4/2016 | Wu ...................... H04W 36/14 |
| | | 455/439 |
| 2016/0345149 A1 | 11/2016 | Chuttani et al. |
| 2019/0327650 A1* | 10/2019 | Yiu ...................... H04W 36/06 |
| 2020/0053541 A1 | 2/2020 | Makabe |
| 2020/0162879 A1 | 5/2020 | Lotfallah et al. |
| 2020/0305224 A1* | 9/2020 | Chong ................ H04L 65/1073 |
| 2021/0037432 A1* | 2/2021 | Li ...................... H04W 36/0072 |
| 2021/0045020 A1 | 2/2021 | Youtz et al. |
| 2021/0250745 A1* | 8/2021 | Thanneeru ........ H04W 36/0022 |
| 2023/0074994 A1* | 3/2023 | Shi ........................ H04W 76/50 |
| 2023/0362763 A1* | 11/2023 | Hu .................... H04W 36/0085 |

* cited by examiner

CONNECTION AND NOTIFICATION FOR PRIORITY COMMUNICATION

RELATED APPLICATIONS

The present application is a National Phase of International Application No. PCT/JP2021/023558, filed Jun. 22, 2021, and claims priority based on Japanese Patent Application No. 2021-059614, filed Mar. 31, 2021.

BACKGROUND OF THE INVENTION

1. Field of the Invention

The present disclosure relates to wireless communication technology.

2. Description of the Related Art

The number, types, and applications of wireless communication devices, represented by smartphones and Internet of Things (IoT) devices, continue to increase, and wireless communication standards continue to be expanded and improved. For example, the commercial service of the 5th generation mobile communication system known as "5G" started in 2018, and the standards are still being developed by the 3GPP (Third Generation Partnership Project).

Patent Literature 1: JP-T-2021-503199

SUMMARY OF THE INVENTION

When a communication device such as a smartphone connected to a wireless communication network is used to make an emergency call to an emergency call phone number, another wireless communication network with better communication quality than the currently connected wireless communication network may be available. Therefore, the quality of the emergency call can be improved by switching from the currently connected wireless communication network to another wireless communication network. However, the currently connected wireless communication network misrecognizes the event as an error of sudden disconnection of the communicator, which results in unnecessary exception processing.

The present disclosure was made in consideration of this situation, and its purpose is to provide a wireless communication system that can facilitate connection to another wireless communication network during priority communication.

In order to solve the above problem, a wireless communication system in a certain form of the present disclosure comprises: a priority communication detection unit that detects priority communication from a communicator communicating wirelessly; a connection unit for connecting the communicator for which the priority communication is detected to a second wireless communication network that is different from a first wireless communication network to which the communicator is connected; and a notification unit that notifies the first wireless communication network that the connection of the communicator to the second wireless communication network is due to the detected priority communication.

According to this aspect, the first wireless communication network is notified that the communicator is connected to the second wireless communication network (another wireless communication network) due to the priority communication. This prevents the first wireless communication network from misrecognizing errors.

Another aspect of the present disclosure is a wireless communication method. The method comprises: detecting priority communication from a communicator communicating wirelessly; connecting the communicator for which the priority communication is detected to a second wireless communication network that is different from a first wireless communication network to which the communicator is connected; and notifying the first wireless communication network that the connection of the communicator to the second wireless communication network is due to the detected priority communication.

In addition, any combination of the above components, and any conversion of the expression of the present disclosure among methods, devices, systems, recording media, computer programs, and the like, is also valid as a form of the present disclosure.

According to the present disclosure, connection to another wireless communication network can be facilitated during priority communication.

DETAILED DESCRIPTION OF THE INVENTION

Figure 1:
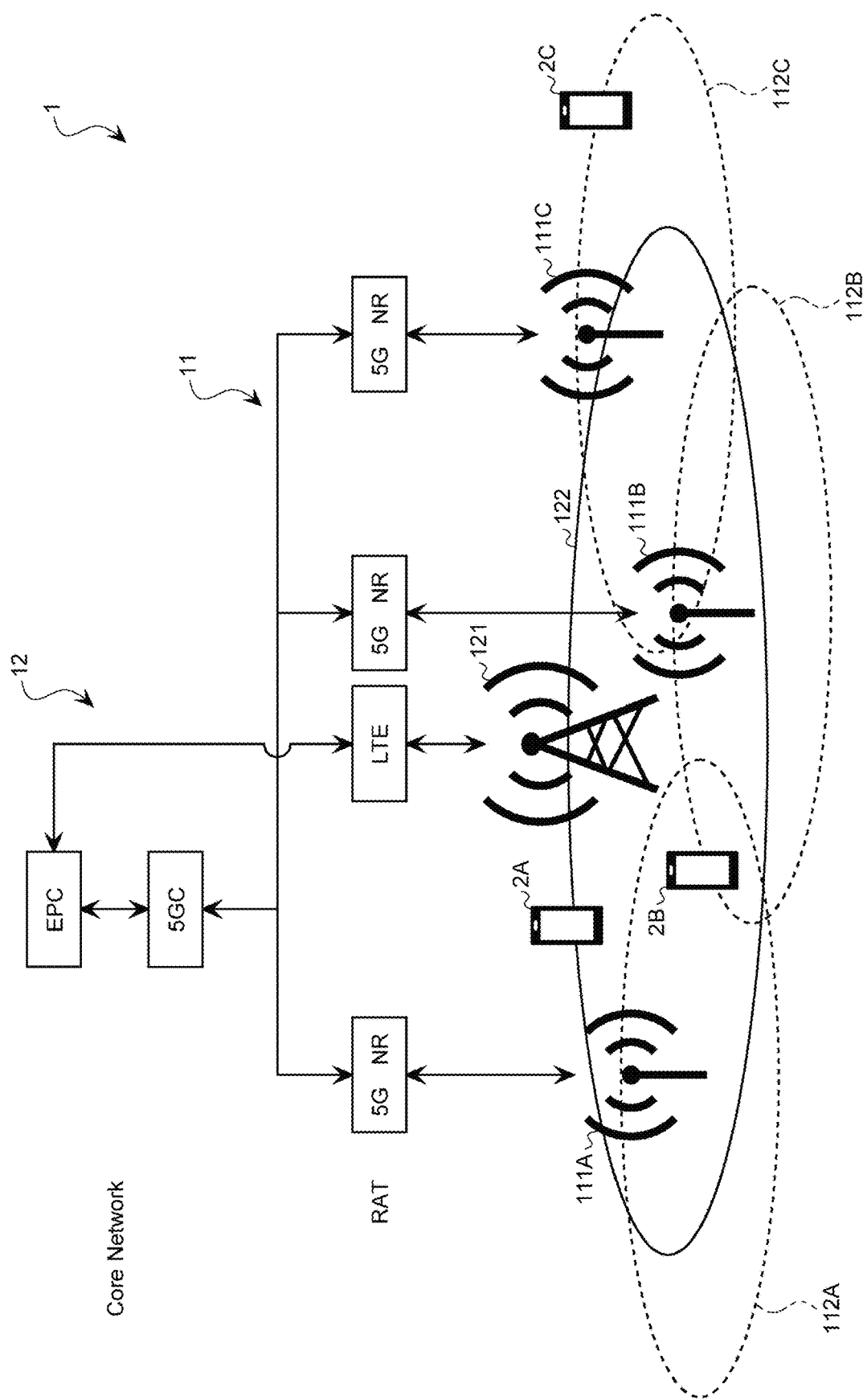
FIG. 1 is a schematic overview of the wireless communication system.

FIG. 1 schematically shows an overview of a wireless communication system 1 in accordance with an embodiment of the present disclosure. The wireless communication system 1 includes 5G wireless communication network 11 and 4G wireless communication network 12. 5G wireless communication network 11 that complies with the 5th generation mobile communication system (5G) uses NR (New Radio) or 5G NR (Fifth Generation New Radio) as the radio access technology (RAT) and 5GC (Fifth Generation Core) as the core network. 4G wireless communication network 12 that complies with the 4th generation mobile communication system (4G) uses LTE (Long Term Evolution) or LTE-Advanced as the radio access technology and EPC (Evolved Packet Core) as the core network. Although not shown in the figure, the wireless communication system 1 may include wireless communication networks of a generation prior to 4G, a generation later than 5G, or any wireless communication networks that are not associated with generations, such as Wi-Fi (registered trademark).

The 5G wireless communication network 11 may include 5G base stations 111A, 111B, and 111C (hereinafter collectively referred to as 5G base station 111) capable of communicating by 5G NR with communication devices or communicators 2A, 2B, and 2C (hereinafter referred to as communication device 2) such as smartphones, which are also referred to as UE (User Equipment). 5G base station 111 is also referred to as gNodeB (gNB). The coverage or support range of each 5G base station 111A, 111B, and 111C is referred to as a cell 112A, 112B, and 112C (hereinafter collectively referred to as cell 112).

The size of the cell 112 of each 5G base station 111 is arbitrary, but typically ranges from a few meters to several tens of kilometers in radius. Although there is no established definition, cells with a radius of a few meters to ten meters are called femtocells, cells with a radius of ten meters to several tens of meters are called picocells, cells with a radius of several tens of meters to several hundred meters are called microcells, and cells with a radius of more than several hundreds of meters are called macrocells. In 5G, high frequency radio waves such as millimeter waves are often used, and their high tendency to propagate in a straight-line causes radio waves to be blocked by obstacles, shortening the communication distance. For this reason, 5G tends to use more small cells than 4G and earlier generations.

In the example shown in the figure, communication device 2B in cells 112A and 112B can communicate with both 5G base stations 111A and 111B by 5G NR. In addition, the communication device 2C in the cell 112C can communicate with the 5G base station 111C by 5G NR. Communication device 2A is outside of all 5G cells 112A, 112B, and 112C, so it is not able to communicate by 5G NR. The 5G NR-based 5G communication between each communicator 2 and each 5G base station 111 is managed by the 5GC, which is the core network. For example, the 5GC transfers data to and from each 5G base station 111, transfers data to and from external networks such as the EPC and the Internet, and manages the movement of the communicator 2.

The 4G wireless communication network 12 comprises a plurality of 4G base stations 121 (only one of them is shown in FIG. 1) that can communicate with the communicator 2 by LTE or LTE-Advanced. The base station 121 in 4G is referred to as eNodeB (eNB). As well as each 5G base station 111, the communication range or support range of each 4G base station 121 is also called a cell and is illustrated as 122.

In the example shown in the figure, the communicators 2A and 2B in the cell 122 can communicate with the 4G base station 121 by LTE or LIE-Advanced. Communication device 2C is outside the cell 122 and is not able to communicate by LTE or LIE-Advanced. The 4G communication by LTE and LIE-Advanced between each communicator 2 and each 4G base station 121 is managed by the EPC, which is the core network. For example, the EPC manages the transfer of data to and from each 4G base station 121, the transfer of data to and from external networks such as 5GC and the Internet, and the movement management of the communicator 2.

If we take a look at each communication device 2A, 2B, and 2C in the example shown in the figure, the communication device 2A is in a state that enables 4G communication with 4G base station 121, and communication device 2B is in a state that enables 5G communication with 5G base stations 111A and 111B and 4G communication with 4G base station 121, and communication device 2C is in a state that enables 5G communication with 5G base station 111C. When there are multiple base stations 111A, 111B, and 121 as in the case of communicator 2B, one base station is selected as the most suitable in terms of communication quality, etc., under the control of the 5GC and/or EPC, which is the core network.

Figure 2:
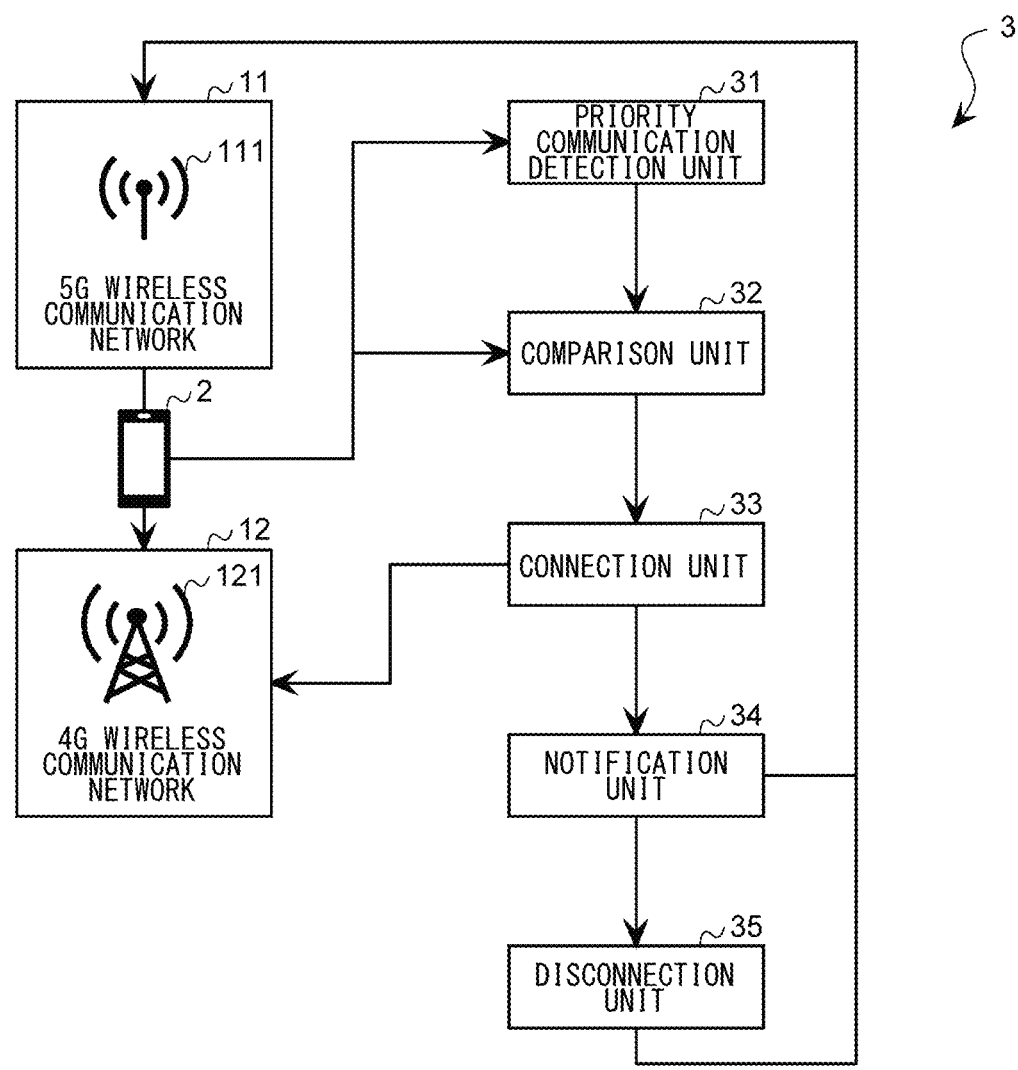
FIG. 2 is a functional block diagram of a priority communication processing apparatus.

FIG. 2 shows a functional block diagram of the priority communication processing apparatus 3 implemented in the wireless communication system 1. The priority communication processing apparatus 3 has a priority communication detection unit 31, a comparison unit 32, a connection unit 33, a notification unit 34 and a disconnection unit 35. These functional blocks are realized by the cooperation of hardware resources, such as the central processing unit, memory, input devices, output devices, and peripheral devices connected to the computer, and software that is executed using them. Regardless of the type of computer or its installation location, each of the above functional blocks may be realized with the hardware resources of a single computer, or by combining hardware resources distributed across multiple computers. Specifically, some or all of each of the above functional blocks may be realized by hardware resources of at least one of: communication device 2; base station 111 in 5G wireless communication network 11 and core network (5GC) in 5G wireless communication network 11; base station 121 in 4G wireless communication network 12 and core network (EPC) in the 4G wireless communication network 12; other components in the operation system of the wireless communication system 1; and any communication device that can communicate with the wireless communication system 1.

The communication device 2 in FIG. 2, like the communication device 2B in FIG. 1, is capable of 5G communication with 5G base station 111 and 4G communication with 4G base station 121. First, we assume that the communicator 2 is connected to the 5G wireless communication network 11 as the first wireless communication network. In the following example, when the communication device 2 starts priority communication, it is connected or switched to the 4G wireless communication network 12 as the second wireless communication network, which is judged to have better communication quality than the 5G wireless communication network 11, and is disconnected from the 5G wireless communication network 11. As another example, the communication device 2 that has started priority communication can be disconnected from the 4G wireless communication network 12 (the first wireless communication network) to which it has been connected. In this case, the communication device 2 is connected or switched to the 5G wireless communication network 11 (the second wireless communication network), which is judged to have better communication quality.

The priority communication detection unit 31 detects priority communication from the communicator 2 that communicates wirelessly. The priority communication detection unit 31 is preferably realized in the communication device 2 and/or the 5G wireless communication network 11, since the communication device 2 at the time of the priority communication has been connected to the 5G wireless communication network 11. Priority communications are communications or phone calls that are set or assigned a higher priority, importance, urgency, etc. than normal communications, and include, for example, calls to emergency call numbers. In Japan, "110" is assigned for emergency calls to police agencies, "119" for emergency calls to fire departments, and "118" for emergency calls to the Japan Coast Guard. The emergency call by eCall, which is an emergency call system for car accidents in Europe, is also an example of priority communication. The communication unit in the car (that corresponds to the communication device 2 shown in the figure) makes an emergency call on the wireless communication network about the occurrence of a car accident and its location. The emergency call by Emergency Services Fallback (ES-FB) and EPS Fallback (Evolved Packet System Fallback) specified in the 5th generation mobile communication system is also an example of priority communication.

The comparison unit 32 compares the communication quality of the 5G wireless communication network 11 (the first wireless communication network) and the 4G wireless communication network 12 (the second wireless communication network) both of which the communicator 2 can communicate with. The criteria for comparing the communication quality are arbitrary, but for example, the communication quality of each wireless communication network can be evaluated based on signal strength, throughput, delay time, packet loss rate, packet error rate, etc. In the example shown in the figure, the communication quality of the 4G wireless communication network 12 is judged by comparison unit 32 to be superior to that of the 5G wireless communication network 11 to which the communicator 2 is connected.

The connection unit 33 shall connect the communicator 2 for which priority communication is detected by the priority communication detection unit 31 to the 4G wireless communication network 12 which is different from the 5G wireless communication network 11 to which it has been connected, according to the comparison result of the comparison unit 32 that the communication quality of the 4G wireless communication network 12 is superior to that of the 5G wireless communication network 11.

The notification unit 34 notifies the 5G wireless communication network 11 that the connection of the communication device 2 to the 4G wireless communication network 12 by the connection unit 33 is due to the priority communication detected by the priority communication detection section 31. After the notification unit 34 notifies the 5G wireless communication network 11, the disconnection unit 35 disconnects the communicator 2 from the 5G wireless communication network 11. In this way, the 5G wireless communication network 11 can recognize in advance from notification unit 34 that the disconnection of the communicator 2 by the disconnection unit 35 is due to priority communication, and unnecessary exception processing can be omitted or avoided without misrecognizing the sudden disconnection of the communicator 2 as an error such as movement of the communicator 2 outside the cell 112, radio link failure (RLF), or power loss of the communicator 2. As shown in the following specific examples, the connection unit 33 may connect the communication device 2 to the 4G wireless communication network 12 after the communication device 2 is disconnected from the 5G wireless communication network 11, or the connection unit 33 may connect the communication device 2 to the 4G wireless communication network 12 before the communication device 2 is disconnected from the 5G wireless communication network 11.

Figure 3:
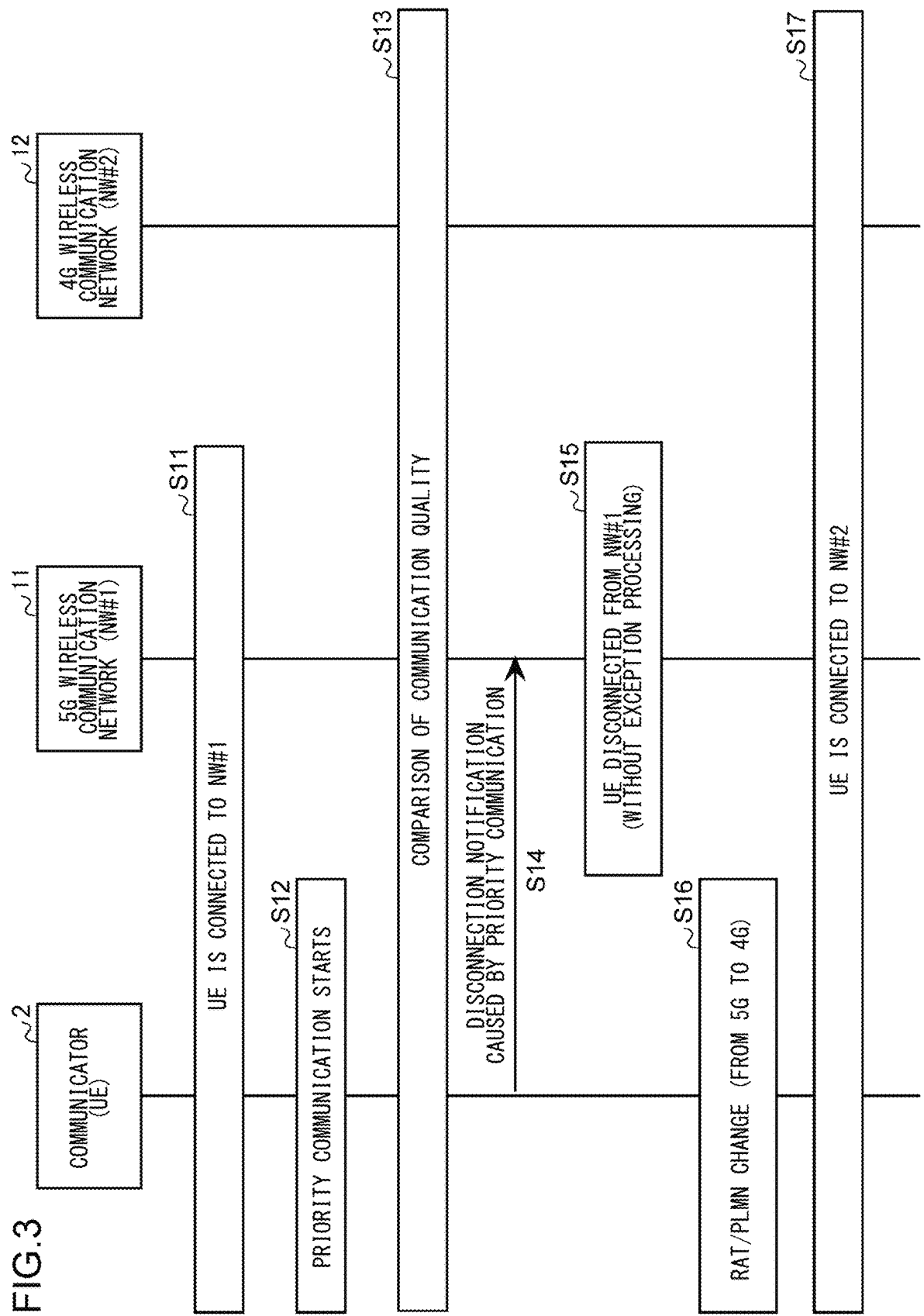
FIG. 3 shows a first example of processing of the priority communication processing apparatus.

FIG. 3 shows the first example of process of the priority communication processing apparatus 3. In this example, the notification unit 34 is provided in the communication device 2. In this figure and similar figures, "S" means step or process. In S11, the communication device 2 (UE) is connected to the 5G wireless communication network 11 (NW #1). In S12, the communication device 2 starts priority communication, and the priority communication detection unit 31 realized in the UE and/or the 5G wireless communication network 11 detects the priority communication. In S13, the comparison unit 32, which is realized in the communication device 2, 5G wireless communication network 11, and/or 4G wireless communication network 12, etc., compares the communication quality of 5G wireless communication network 11 and 4G wireless communication network 12 (NW #2).

In S14, according to the result of the comparison in S13 that the communication quality of the 4G wireless communication network 12 is better than that of the 5G wireless communication network 11, the notification unit 34 realized in the communicator 2 notifies the 5G wireless communication network 11 that the communicator 2 is disconnected from the 5G wireless communication network 11 due to the priority communication detected in S12 (S15), and/or that the communicator 2 is connected to the 4G wireless communication network 12 (S17). This notification from the communicator 2 is sent to the 5G wireless communication network 11 as a message on the Access Stratum (AS) and/or Non-Access Stratum (NAS), which are functional layers in the Universal Mobile Telecommunications System (UMTS) protocol stack.

In S15, the disconnection unit 35 disconnects the communication device 2 from the 5G wireless communication network 11 after the notification in S14. The 5G wireless communication network 11 or the operation system (OPS) of the wireless communication system 1 that receives the notification from the communicator 2 in S14 can recognize in advance that the disconnection of the communicator 2 in S15 is caused by the priority communication detected in S12. Therefore, unnecessary exception processing can be omitted without misrecognizing the disconnection of the communicator 2 in S15 as an error.

In S16, the radio access technology (RAT) and the Public Land Mobile Network (PLMN) are switched from the 5G wireless communication network 11 to the 4G wireless communication network 12 to prepare for the connection of the communicator 2 to the 4G wireless communication network 12. Specifically, the radio access technology is changed from NR or 5G NR in 5G to LTE or LTE-Advanced in 4G. PLMN or PLMN number is an identification number of the wireless communication network, which is a combination of MCC (Mobile Country Code) representing a country or region and MNC (Mobile Network Code) representing an operator. In S17, the connection unit 33 connects the communicator 2 to the 4G wireless communication network 12. In this way, priority communication with high priority can be performed on the 4G wireless communication network 12 with high communication quality. In the example shown in FIG. 3, the connection of the communication device 2 to the 4G wireless communication network 12 by the connection unit 33 in S17 is performed after the disconnection of the communication device 2 from the 5G wireless communication network 11 by the disconnection unit 35 in S15.

Figure 4:
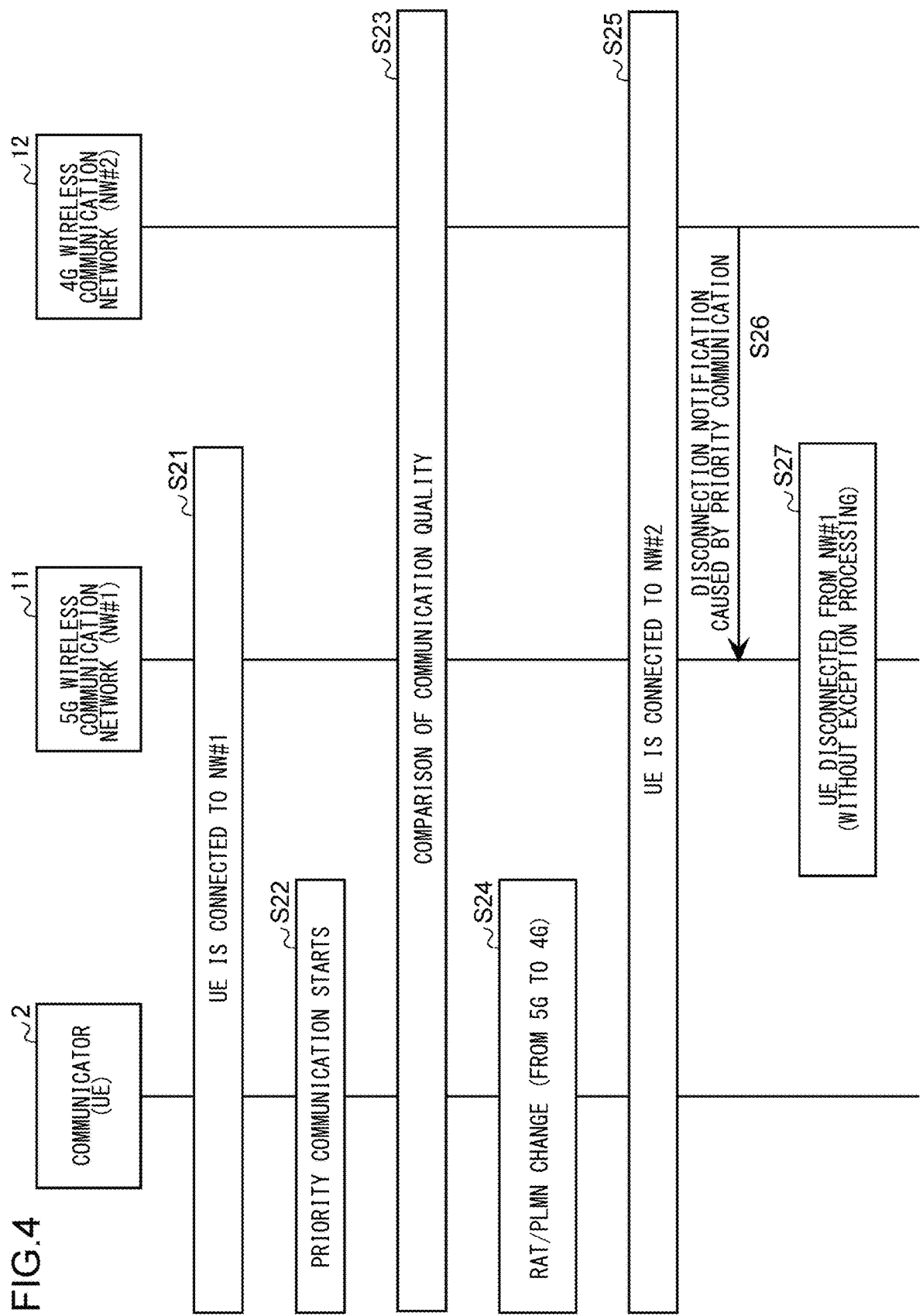
FIG. 4 shows the second example of processing of the priority communication processing apparatus.

FIG. 4 shows the second example of process of the priority communication processing apparatus 3. In this example, the notification unit 34 is realized in the 4G wireless communication network 12 (NW #2) as the second wireless communication network. In S21, the communication device 2 (UE) is connected to the 5G wireless communication network 11 (NW #1). In S22, the communicator 2 starts priority communication, and the priority communication detection unit 31 realized in the communicator 2 and/or the 5G wireless communication network 11 detects the priority communication. In S23, the comparison unit 32, which is realized in the communication device 2, 5G wireless communication network 11, and/or 4G wireless communication network 12, etc., compares the communication quality of 5G wireless communication network 11 and 4G wireless communication network 12.

In S24, according to the result of the comparison in S23 that the communication quality of the 4G wireless communication network 12 is better than that of the 5G wireless communication network 11, the radio access technology (RAT) and the Public Land Mobile Network (PLMN) are switched from the 5G wireless communication network 11 to the 4G wireless communication network 12 to prepare for the connection of the communicator 2 to the 4G wireless communication network 12. In S25, the connection unit 33 connects the communication device 2 to the 4G wireless communication network 12. In this way, priority communication with high priority can be performed on the 4G wireless communication network 12 with high communication quality.

In S26, the notification unit 34 realized in the 4G wireless communication network 12 notifies the 5G wireless communication network 11 that the communicator 2 is disconnected from the 5G wireless communication network 11 due to the priority communication detected in S22 (S27), and/or that the communicator 2 is connected to the 4G wireless communication network 12 (S25). In S27, the disconnection unit 35 disconnects the communication device 2 from the 5G wireless communication network 11 after the notification in S26. The 5G wireless communication network 11 or the operation system (OPS) of the wireless communication system 1 that receives the notification from the 4G wireless communication network 12 in S26 can recognize in advance that the disconnection of the communicator 2 in S27 is caused by the priority communication detected in S22. Therefore, unnecessary exception processing can be omitted without misrecognizing the disconnection of the communicator 2 in S27 as an error. In the example shown in FIG. 4, the connection of the communication device 2 to the 4G wireless communication network 12 by the connection unit 33 in S25 is performed before the disconnection of the communication device 2 from the 5G wireless communication network 11 by the disconnection unit 35 in S27.

The present disclosure has been described above based on embodiments. It is understood by those skilled in the art that the embodiments are exemplary and that various variations are possible in the combination of each component and each process thereof, and that such variations are also within the scope of the present disclosure.

In the embodiment, the communication device 2 is switched from the first wireless communication network (5G wireless communication network 11) to the second wireless communication network (4G wireless communication network 12) according to the comparison results of the communication quality by comparison unit 32. However, the communication device 2 may be switched from the first wireless communication network to the second wireless communication network following the detection of priority communication by the priority communication detection unit 31 without comparing the communication quality. For example, when a communication device 2 connected to the 5G wireless communication network 11 starts priority communication, it may immediately switch its connection and perform the priority communication on 4G wireless communication network 12.

The functional configuration of each device described in the embodiment can be realized by hardware resources or software resources, or by the cooperation of hardware resources and software resources. As hardware resources, processors, ROM, RAM, and other LSIs can be used. Operating systems, applications, and other programs can be used as software resources.

The present disclosure relates to wireless communication technology.

What is claimed is:

1. A wireless communication system comprising:
a priority communication detection unit that detects priority communication from a communicator communicating wirelessly;
a connection unit for connecting the communicator for which the priority communication is detected to a second wireless communication network that is different from a first wireless communication network to which the communicator is connected;
a notification unit that notifies the first wireless communication network that the connection of the communicator to the second wireless communication network is due to the detected priority communication; and
a disconnection unit that disconnects the communicator from the first wireless communication network after the notification unit notifies the first wireless communication network,
wherein the first wireless communication network omits exception processing regarding disconnection of the communicator by the disconnection unit.

2. The wireless communication system according to claim 1, wherein the notification unit is provided in the communicator.

3. The wireless communication system according to claim 1, wherein the notification unit is provided in the second wireless communication network.

4. The wireless communication system according to claim 1, further comprising a comparison unit for comparing the communication quality of the first wireless communication network and the second wireless communication network; and
in case the communication quality of the second wireless communication network is better than the communication quality of the first wireless communication network, the connection unit connects the communicator for which the priority communication is detected to the second wireless communication network.

5. The wireless communication system according to claim 1, wherein the first wireless communication network and the second wireless communication network use different radio access technologies.

6. The wireless communication system according to claim 5, wherein the radio access technology includes at least one of NR and LTE.

7. The wireless communication system according to claim 1, wherein the first wireless communication network and the second wireless communication network use different core networks.

8. The wireless communication system according to claim 7, wherein the core network includes at least one of 5GC and EPC.

9. The wireless communication system according to claim 1, wherein the priority communication includes a call to an emergency call number.

10. A wireless communication system comprising:
a priority communication detection unit that detects priority communication from a communicator communicating wirelessly;
a connection unit for connecting the communicator for which the priority communication is detected to a second wireless communication network that is different from a first wireless communication network to which the communicator is connected;
a notification unit that notifies the first wireless communication network that the connection of the communicator to the second wireless communication network is due to the detected priority communication; and
a disconnection unit that disconnects the communicator from the first wireless communication network after the notification unit notifies the first wireless communication network, wherein the connection unit connects the communicator to the second wireless communication network after the communicator is disconnected from the first wireless communication network.

11. A wireless communication system comprising:
a priority communication detection unit that detects priority communication from a communicator communicating wirelessly;
a connection unit for connecting the communicator for which the priority communication is detected to a second wireless communication network that is different from a first wireless communication network to which the communicator is connected;
a notification unit that notifies the first wireless communication network that the connection of the communicator to the second wireless communication network is due to the detected priority communication; and
a disconnection unit that disconnects the communicator from the first wireless communication network after the notification unit notifies the first wireless communication network,
wherein the connection unit connects the communicator to the second wireless communication network before the communicator is disconnected from the first wireless communication network.

* * * * *